United States Patent
Bortnick et al.

(10) Patent No.: US 7,244,781 B2
(45) Date of Patent: Jul. 17, 2007

(54) COMPOSITE COMPOSITIONS INCLUDING POLYMERIC NANOPARTICLES AND CLAY NANOPARTICLES

(75) Inventors: Newman Mayer Bortnick, Oreland, PA (US); Dennis Paul Lorah, Lansdale, PA (US)

(73) Assignee: Rohm and Haas Company, Philadelphia, PA (US)

( * ) Notice: Subject to any disclaimer, the term of this patent is extended or adjusted under 35 U.S.C. 154(b) by 503 days.

(21) Appl. No.: 10/828,666

(22) Filed: Apr. 21, 2004

(65) Prior Publication Data

US 2005/0171265 A1 Aug. 4, 2005

Related U.S. Application Data

(60) Provisional application No. 60/465,359, filed on Apr. 25, 2003.

(51) Int. Cl.
*C08K 3/34* (2006.01)

(52) U.S. Cl. .................. 524/445; 525/146

(58) Field of Classification Search .......... 524/445
See application file for complete search history.

(56) References Cited

U.S. PATENT DOCUMENTS

| 4,558,075 | A | * | 12/1985 | Suss et al. ............ 523/216 |
|---|---|---|---|---|
| 4,810,734 | A | | 3/1989 | Kawasumi et al. ......... 523/216 |
| 4,814,373 | A | * | 3/1989 | Frankel et al. .............. 524/460 |
| 4,889,885 | A | | 12/1989 | Usuki et al. ................ 524/445 |
| 5,312,863 | A | * | 5/1994 | Van Rheenen et al. ..... 524/555 |
| 5,552,469 | A | * | 9/1996 | Beall et al. ................. 524/445 |
| 5,883,173 | A | | 3/1999 | Elspass et al. .............. 524/446 |
| 6,218,465 | B1 | * | 4/2001 | Kobayashi et al. ......... 524/847 |
| 6,271,298 | B1 | | 8/2001 | Powell ....................... 524/445 |
| 2002/0193521 | A1 | * | 12/2002 | Cruz et al. .................. 525/146 |

FOREIGN PATENT DOCUMENTS

| EP | 1 245 643 A2 | 10/2002 |
|---|---|---|
| EP | 1 371 693 A2 | 12/2003 |
| WO | WO 02/070589 A2 | 9/2002 |

OTHER PUBLICATIONS

Xavier Kornmann; Synthesis and Characterisation of Thermoset-Clay Nanocomposites; Lulea University of Technology; 29 pages, 1999.

* cited by examiner

*Primary Examiner*—Katarzyna Wyrozebski
(74) *Attorney, Agent, or Firm*—Andrew E. C. Merriam

(57) ABSTRACT

Composite compositions that include polymeric nanoparticles and clay nanoparticles, and a method for forming the compositions are provided. The polymeric nanoparticles of particular compositions have a mean diameter from 1 to 50 nm. Also provided are polymeric compositions including the composite compositions and a method for forming them.

8 Claims, No Drawings

COMPOSITE COMPOSITIONS INCLUDING POLYMERIC NANOPARTICLES AND CLAY NANOPARTICLES

This application claims the benefit of U.S. Provisional Application No. 60/465,359, filed Apr. 25, 2003.

This invention relates to composites including polymeric nanoparticles and clay nanoparticles. More particularly, this invention relates to composites including polymeric nanoparticles ("PNPs" herein) including, as copolymerized units, from 1% to 50%, by weight based on the weight of the nanoparticles, of at least one multiethylenically unsaturated first monomer; from 2% to 75%, by weight based on the weight of the nanoparticles, of at least one ethylenically unsaturated second monomer, said second monomer bearing at least one group selected from the set consisting of hydroxy; silyl; polyalkylene oxide; quaternary ammonium; quaternary phosphonium; and amines, amine N-oxides, carboxylic acids, sulfur acids and phosphorous acids, and salts thereof, and from 0% to 97%, by weight based on the weight of the nanoparticles, of at least one monoethylenically unsaturated third monomer, the nanoparticles having a mean diameter of from 1 to 50 nanometers ("nm" herein); and clay nanoparticles ("CNPs" herein).

Certain clays are available in the form of aggregates or stacks of CNPs, the CNPs commonly referred to as layers or platelets. By CNPs is meant herein particles that have a size in at least one dimension which is in the range of from 0.5 to 40 nm; typically the CNPs are plate-shaped with length and width measurements of the order of from 100 nm to 500 nm and a thickness of from 0.5 nm to 5 nm. Aggregates of such clays typically each contain hundreds of CNPs and are relatively hydrophilic; they are subject to being hydrophobically modified by treatment with various molecules, particularly with cationic surfactants having a cationic grouping and a hydrophobic grouping, in order to render the hydrophilic layered clay aggregates more hydrophobic through intercalation of the basic clay particles or layers with the surfactant bearing a hydrophobic grouping and preferably, to some extent, breaking the aggregates down to smaller aggregates containing tens of CNPs, and in some embodiments, to some extent, delaminating the clay layers to provide individual CNPs associated with the surfactants. The net result is to provide modified CNPs that are hydrophobic enough to be compatible with polymers, thereby permitting the CNPs to function as effective modifying agents for other polymers, U.S. Pat. No. 5,883,173 discloses a layered material such as a layered silicate material treated with a surfactant such as an onium surfactant and subsequently intercalated with emulsion- or microemulsion-polymer particles. Also disclosed is a process including mixing a slurry of clay, onium surfactant and monomers for 20 hours at 23 C, followed 26 hours at 65 C in order to effect intercalation and polymerization.

Not only is there a need for a more efficient process but the surfactants used in the prior process are sometimes deleterious to polymer properties and system stability. There is also a need for an alternative process which provides compositional flexibility in the polymeric intercalate in order to achieve compatibility of the composites with a broad range of other polymers and to achieve enhanced thermal stability of the composites. Further, there is a need for composites in which both the polymeric component and the clay component of the composites are present as nanoscale entities in order to maximize the area of contact between the composites and other polymers.

In a first aspect of the present invention there is provided a composite composition comprising (a) polymeric nanoparticles comprising, as copolymerized units, from 1% to 50%, by weight based on the weight of said nanoparticles, of at least one multiethylenically unsaturated first monomer; from 2% to 75%, by weight based on the weight of said nanoparticles, of at least one ethylenically unsaturated second monomer, said second monomer bearing at least one group selected from the set consisting of hydroxy; silyl; polyalkylene oxide; quaternary ammonium; quaternary phosphonium; and amines, amine N-oxides, carboxylic acids, sulfur acids and phosphorous acids, and salts thereof; and from 0% to 97%, by weight based on the weight of said nanoparticles, of at least one monoethylenically unsaturated third monomer, said nanoparticles having a mean diameter from 1 to 50 nm; and (b) clay nanoparticles.

In a second aspect of the present invention there is provided a method of forming a composite composition comprising: (a) providing polymeric nanoparticles comprising, as copolymerized units, from 1% to 50%, by weight based on the weight of said nanoparticles, of at least one multiethylenically unsaturated first monomer; from 2% to 75%, by weight based on the weight of said nanoparticles, of at least one ethylenically unsaturated second monomer, said second monomer bearing at least one group selected from the set consisting of hydroxy; silyl; polyalkylene oxide; quaternary ammonium; quaternary phosphonium; and amines, amine N-oxides, carboxylic acids, sulfur acids and phosphorous acids, and salts thereof; and from 0% to 97%, by weight based on the weight of said nanoparticles, of at least one monoethylenically unsaturated third monomer, said nanoparticles having a mean diameter from 1 to 50 nm; and (b) admixing clay nanoparticles.

In a third aspect of the present invention there is provided a composition comprising a continuous polymeric phase, said phase comprising therein the composite composition of the first aspect of the present invention.

In the fourth aspect of the present invention there is provided a method of forming the composition of the third aspect of the present invention.

The composite composition of the present invention includes PNPs that include, as copolymerized units, from 1% to 50%, by weight based on the weight of the nanoparticles, of at least one multiethylenically unsaturated first monomer; from 2% to 75%, by weight based on the weight of the nanoparticles, of at least one ethylenically unsaturated second monomer, the second monomer bearing at least one group selected from the set consisting of hydroxy; silyl; polyalkylene oxide; quaternary ammonium; quaternary phosphonium; and amines, amine N-oxides, carboxylic acids, sulfur acids and phosphorous acids, and salts thereof; and from 0% to 97%, by weight based on the weight of the nanoparticles, of at least one monoethylenically unsaturated third monomer, the nanoparticles having a mean diameter from 1 to 50 nm.

The PNPs of the present invention include, as copolymerized units, from 1% to 50%, preferably from 3% to 20%, and more preferably from 5% to 15%, by weight based on the weight of the PNPs, of at least one multiethylenically unsaturated first monomer. Suitable multi-ethylenically-unsaturated first monomers useful in the present invention include di-, tri-, tetra-, or higher multifunctional ethylenically unsaturated monomers such as, for example, divinyl benzene, trivinylbenzene, divinyltoluene, divinylpyridine, divinylnaphthalene divinylxylene, ethyleneglycol diacrylate, trimethylolpropane triacrylate, diethyleneglycol divinyl ether, trivinylcyclohexane, allyl methacrylate, ethyleneglycol dimethacrylate, diethyleneglycol di(meth)acrylate, propyleneglycol di(meth)acrylate, trimethylolpropane tri(meth)acrylate, 2,2-dimethylpropane-1,3-diacrylate, 1,3-butylene glycol di(meth)acrylate, 1,4-butanediol diacrylate, 1,6-hexanediol di(meth)acrylate, tripropylene glycol diacrylate, triethylene glycol dimethacrylate, polyethylene glycol 200 diacrylate, tetraethylene glycol di(meth)acrylate, polyethylene glycol dimethacrylate, ethoxylated bisphenol A di(meth)acrylate, polyethylene glycol 600 dimethacrylate, poly(butanediol) diacrylate, pentaerythritol triacrylate, trimethylolpropane triethoxy triacrylate, glyceryl propoxy triacrylate, pentaerythritol tetra(meth)acrylate, dipentaerythritol monohydroxypentaacrylate, divinyl silane, trivinyl silane, dimethyl divinyl silane, divinyl methyl silane, methyl trivinyl silane, diphenyl divinyl silane, divinyl phenyl silane, trivinyl phenyl silane, divinyl methyl phenyl silane, tetravinyl silane, dimethyl vinyl disiloxane, poly(methyl vinyl siloxane), poly(vinyl hydro siloxane), poly(phenyl vinyl siloxane), and mixtures thereof. The term "(meth)acrylic" herein includes both acrylic and methacrylic and the term "(meth)acrylate" includes both acrylate and methacrylate. Likewise, the term "(meth)acrylamide" refers to both acrylamide and methacrylamide. "Alkyl" includes straight chain, branched and cyclic alkyl groups.

The PNPs of the present invention include, as copolymerized units, from 2% to 75%, preferably from 5% to 60%, and more preferably from 10% to 60%, by weight based on the weight of the nanoparticles, of at least one ethylenically unsaturated second monomer, the second monomer bearing at least one group selected from the set consisting of hydroxy; silyl; polyalkylene oxide; quaternary ammonium; quaternary phosphonium; and amines, amine N-oxides, carboxylic acids, sulfur acids and phosphorous acids, and salts thereof. Preferred are PNPs containing greater than 5%, more preferably greater than 10%, and even more preferably greater than 20%, by weight based on the weight of the PNPs, of at least one copolymerized second monomer. It is envisioned that a second monomer may be multiethylenically unsaturated in which case it is counted as both the first monomer and as the second monomer.

Suitable second monomers include, for example, 2-hydroxyethyl (meth)acrylate, 2-hydroxypropyl (meth)acrylate, 1-methyl-2-hydroxyethyl (meth)acrylate, 2-hydroxybutyl (meth)acrylate, polyethylene glycol (meth)acrylate, dimethylaminoethyl (meth)acrylate, N,N-dimethylaminoethyl (meth)acrylamide, N,N-dimethyl-aminopropyl (meth)acrylamide, N,N-dimethylaminobutyl (meth)acrylamide, N,N-di-ethylaminoethyl (meth)acrylamide, 2-hydroxyethyl acrylamide, silyl monomers that include substituted silyl monomers herein such as γ-propyl tri($C_1$-$C_6$)alkoxysilyl (meth)acrylate, γ-propyl tri($C_1$-$C_6$)alkylsilyl (meth)acrylate, γ-propyl di($C_1$-$C_6$)alkoxy($C_1$-$C_6$)alkylsilyl (meth)acrylate, γ-propyl di($C_1$-$C_6$)alkyl($C_1$-$C_6$)alkoxysilyl (meth)acrylate, vinyl tri($C_1$-$C_6$)alkoxysilyl (meth)acrylate, vinyl di($C_1$-$C_6$)alkoxy($C_1$-$C_6$)alkylsilyl (meth)acrylate, vinyl ($C_1$-$C_6$)alkoxydi($C_1$-$C_6$)alkylsilyl (meth)acrylate, vinyl tri($C_1$-$C_6$)alkylsilyl (meth)acrylate, vinylpyridines such as 2-vinylpyridine or 4-vinylpyridine; lower alkyl ($C_1$-$C_8$) substituted N-vinylpyridines such as 2-methyl-5-vinylpyridine, N-vinylcaprolactam; N-vinylbutyrolactam; N-vinylpyrrolidone; vinyl imidazole; N-vinylcarbazole; N-vinylsuccinimide; (meth)acrylonitrile; o-, m-, or p-aminostyrene; maleimide; N-vinyl-oxazolidone; N,N-dimethylaminoethylvinylether; ethyl-2-cyanoacrylate; vinylacetonitrile; N-vinylphthalimide; N-vinylpyrrolidones such as N-vinylthiopyrrolidone, 3 methyl-1-vinylpyrrolidone; vinylpyrroles; vinylanilines; and vinylpiperidines, quaternary ammonium monomers such as, for example, quaternized tertiary amine monomers, quaternized cyclic amine monomers, and quaternized aromatic amine monomers, and quaternary phosphonium monomers. It is also envisioned that second monomers such as those exemplified hereinabove may be formed from precursor monomers after the PNPs are formed such as, for example, post-quaternization of a formed amine-functional PNP. Preferred second monomers are amine monomers and their salts and quaternary ammonium monomers. More preferred second monomers are amine monomers at a level of from 10 to 60% by weight, based on the weight of the PNPs.

In certain embodiments two or more different second monomers may be used. In some embodiments amphoteric PNPs including, as copolymerized units, an amine monomer and a carboxylic acid monomer, or their salts, may be formed. Such PNPs are expected to be particularly advantageous for forming water dispersible PNP-CNP composites.

The PNPs of the present invention include, as copolymerized units, from 0% to 97%, by weight based on the weight of the nanoparticles, of at least one monoethylenically unsaturated third monomer, the monoethylenically unsaturated monomer expressly not including monomers defined herein as first monomer, second monomer, or both first monomer and second monomer. Suitable third monomers include $C_1$-$C_{24}$ alkyl (meth)acrylates, such as methyl (meth)acrylate, ethyl (meth)acrylate, propyl (meth)acrylate, butyl (meth)acrylate, isobutyl (meth)acrylate, hexyl (meth)acrylate, cyclohexyl (meth)acrylate, 2-ethylhexyl (meth)acrylate, octyl (meth)acrylate, decyl (meth)acrylate, dodecyl (meth)acrylate, pentadecyl (meth)acrylate, hexadecyl (meth)acrylate, octadecyl (meth)acrylate, and nonadecyl (meth)acrylate, and mixtures thereof. Other suitable third monomers include vinyl acetate; vinyl versatate; diisobutylene; vinyl aromatic monomers, such as styrene, α-methylstyrene, vinyltoluene, p-methylstyrene, ethylvinylbenzene, vinylnaphthalene, and vinylxylenes. The vinylaromatic monomers also include their corresponding substituted counterparts, such as halogenated derivatives, and the like.

A suitable process to prepare the PNPs according to the present invention is free radical solution polymerization of the selected monomers. By "solution polymerization" herein is meant free radical addition polymerization in a suitable solvent for the polymer. By "suitable solvent for the polymer" herein is meant that linear random (co)-polymers having substantially similar polymerized monomer units to the PNPs are soluble in the solvent. Another method for selecting a suitable solvent or mixture of solvents is on the basis of using solubility parameter analysis. According to such methods, the suitability of the solvent is determined by substantially matching the solubility parameters of the PNP and of the solvent, such as the Van Krevelen parameters of delta d, delta p, delta h and delta v. See, for example, Van Krevelen et al., *Properties of Polymers. Their Estimation and Correlation with Chemical Structure*, Elsevier Scientific Publishing Co., 1976; Olabisi et al., *Polymer-Polymer Miscibility*, Academic Press, NY, 1979; Coleman et al., *Specific Interactions and the Miscibility of Polymer Blends*, Technomic, 1991; and A. F. M. Barton, *CRC Handbook of Solubility Parameters and Other Cohesion Parameters*, 2nd Ed., CRC Press, 1991. Delta d is a measure of dispersive interactions, delta p is a measure of polar interactions, delta h is a measure of hydrogen bonding interactions, and delta v is a measure of both dispersive and polar interactions. Such solubility parameters are either calculated, such as by the group contribution method, or determined experimentally, as is known in the art. A preferred solvent has a delta v parameter within 4 (joule per cubic centimeter)$^{1/2}$, preferably within 1 joule per cubic centimeter)$^{1/2}$ of the polymer delta v parameter. Suitable solvents for the polymerization include organic solvents such as hydrocarbons; alkanes; halohydrocarbons; chlorinated, fluorinated, and brominated hydrocarbons; aromatic hydrocarbons; ethers; ketones; esters; alcohols; and mixtures thereof. Particularly suitable solvents, depending on the composition of the PNP, include dodecane, mesitylene, xylenes, diphenyl ether, gamma-butyrolactone, ethyl acetate, ethyl lactate, propyleneglycol monomethyl ether acetate, caprolactone, 2-heptanone, methylisobutyl ketone, acetone, methyl ethyl ketone, diisobutylketone, propyleneglycol monomethyl ether, and alkylalcohols, such as isopropanol, decanol, and t-butanol, and supercritical carbon dioxide.

The PNPs are prepared by first charging a solvent or, alternatively, a mixture of solvent and some portion of the monomers, to a reaction vessel. The monomer charge is typically composed of monomers, initiator, and chain transfer agent, if any. Typically, initiation temperatures are in the range of from 55° C. to about 125° C., although lower or higher initiation temperatures are possible using suitable low temperature or high temperature initiators known in the art. After the heel charge has reached a temperature sufficient to initiate polymerization, the monomer charge or balance of the monomer charge is added to the reaction vessel. The monomer charge time period is typically in the range of from 15 minutes to 4 hours, although both shorter and longer time periods are envisioned. During the monomer charge, the reaction temperature is typically kept constant, although it is possible to vary the reaction temperature. After completing the monomer mixture addition, additional initiator in solvent can be charged to the reaction and/or the reaction mixture may be held for a time.

In this embodiment the PNPs are provides as a dispersion in the polymerization solvent but, alternatively, they can be isolated, for example, by vacuum evaporation, by precipitation into a non-solvent, and by spray drying. The isolated PNPs may be subsequently redispersed in an aqueous or a solvent-based medium. In an additional embodiment the PNPs dispersed in the polymerization solvent are subjected to a solvent transfer process to provide a dispersion of PNPs in a different medium. The medium in which the PNPs are dispersed is alternatively water-based or solvent-based. By "water-based" is meant herein a single phase that contains from 50 to 100 weight % water, based on the weight of the medium. By "solvent-based" is meant herein that a single phase that contains less than 50 weight % water, based on the weight of the medium.

Initiators useful in the free radical polymerization of the PNPs of the present invention include, but are not limited to, one or more of: peroxyesters, dialkylperoxides, alkylhydroperoxides, persulfates, azoinitiators, redox initiators and the like. The amount of the free radical initiator used is typically from 0.05 to 10% by weight, based on the weight of total monomer.

The PNPs of the present invention typically have an apparent weight average molecular weight, as determined by GPC, in the range of from 2,000 to 2,000,000, preferably in the range of from 3,000 to 1,000,000, and more preferably in the range of from 3,500 to 500,000, and most preferably in the range of from 4,000 to 400,000. As used herein, the term "apparent weight average molecular weight" reflects the size of the PNP particles using gel permeation chromatography methods, namely, using THF solvent at 40° C., 3 Plgel Columns (manufactured by Polymer Labs, Amherst, Mass.), 100 Angstroms (10 nm), $10^3$ Angstroms (100 nm), $10^4$ Angstroms (1 micron), 30 cm long, 7.8 mm ID, 1 milliliter/minute, 100 microliter injection volume, calibrated to narrow polystyrene standards using Polymer Labs CALIBRE™ software.

Control of PNP particle size and particle size distribution is achieved by one or more of such methods as choice of solvent, initiator, total solids level, amount and type of multi-functional monomer, type and amount of chain transfer agent, initiator level and reaction conditions. In the various embodiments of the present invention, unless indicated otherwise, the PNPs have a mean diameter in the range of from 1 to 50 nm, preferably in the range of from 1 to 40 nm, more preferably in the range of from 1 to 30 nm, even more preferably in the range of from 1 to 25 nm, further preferably in the range of from 1 to 20 nm, and most preferably in the range of from 2 to 10 nm. Mean particle diameters of the PNPs are determined by using standard dynamic light scattering techniques wherein the correlation functions are converted to hydrodynamic sizes using LaPlace inversion methods, such as CONTIN.

Typically, PNPs including as polymerized units, less than 10 wt % multiethylenically unsaturated monomer, have a glass transition temperature of from −90° C. to 170° C. for the composition in the absence of the polymerized multiethylenically unsaturated monomer, as determined by a modulated differential scanning calorimetry measurement.

The PNPs are optionally characterized as having suitable hydrophilicities that allow the PNPs to be dispersed into an aqueous medium. One method to characterize the hydrophilicity of the PNPs is to calculate the Hansch parameter. The Hansch parameter is calculated using a group contribution method. The monomer units forming the polymer are assigned a hydrophobicity contribution and the relative hydrophobicity of the polymer is calculated based on the weight average of the monomers in the polymer. Hansch and Fujita, J. Amer. Chem. Soc., 86, 1616-1626 (1964); H. Kubinyi, *Methods and Principles of Medicinal Chemistry*, Volume 1, R. Mannhold et al., Eds., VCH, Weinheim (1993); C. Hansch and A. Leo, *Substituent Constants for Correlation Analysis in Chemistry and Biology*, Wiley, New York (1979); and C. Hansch, P. Maloney, T. Fujita, and R. Muir, Nature, 194. 178-180 (1962). Values of the hydrophobicity contributions for several monomers are listed in Table 1.

TABLE 1

| Monomer | Hydrophobicity Contribution |
| --- | --- |
| ethyl acrylate | 2.11 |
| butyl acrylate | 3.19 |
| 2-ethyl hexylacrylate | 5.22 |
| styrene | 4.29 |
| methyl methacrylate | 1.89 |
| ethyl methacrylate | 2.43 |
| butyl methacrylate | 3.51 |
| isobornyl methacrylate | 2.22 |
| butadiene | 4.0 |
| acrylic acid | −2.52 |
| methacrylic acid | −2.2 |
| maleic anhydride | −3.5 |

Preferred PNPs have a Hansch Parameter in the Range of From −1 to 4.

The nanocomposite composition of the present invention includes clay nanoparticles ("CNPs"). Certain clays, referred to herein as "CNP precursors", are available in the form of aggregates or stacks of CNPs, the CNPs commonly referred to as layers or platelets. By CNPs is meant herein that the particles have a size in at least one dimension which is in the range of from 0.5 to 40 nm; typically the CNPs are plate-shaped with length and width measurements of the order of from 100 to 500 nm and a thickness of from 0.5 to 5 nm.

Suitable CNP precursors include, for example, smectite clay, including saponite, laponite, kaolinite, beidellite, nontronite, hectorite, fluorohectorite, stevensite, montmorillonite, vermiculite and halloysite, that are typically comprised of hydrated aluminum silicates that are fine-grained and have a platy habit. A preferred CNP precursor for the practice of this invention is montmoillonite; more preferred is sodium montnorillonite. Modified CNP precursors such as surfactant-modified CNP precursors including, for example, alkyl onium-modified CNP precursors or alkyl onium-modified CNPs may also be used in the present invention; typical alkyl onium ions are alkylammonium ion such as, for example, $CH_3$-$(CH_2)_n$-$NH_3^+$ where n is between 1 and 18. The crystalline structure of a typical clay mineral is a multi-layered structure comprised of combinations of layers of $SiO_4$ tetrahedra that are joined to layers of $AlO(OH)_2$ octahedra. The term "gallery", as used herein, describes the interlayer spaces of the layered clay minerals. The terms "d-spacing" or "basal spacing", as used herein, define the sum of the single layer thickness and the thickness of the interlayer or gallery, which is the repeat unit of the multilayer mineral. Depending upon the clay mineral, the gallery may contain water and/or other constituents such as potassium, sodium, or calcium cations. Clay minerals vary based upon the combination of their constituent layers and cations. Isomorphic substitution of the cations of clay mineral, such as $Al^{3+}$ or $Fe^{3+}$ substituting for the $Si^{4+}$ ions in the tetrahedral network, or $Al^{3+}$, $Mg^{2+}$ or $Fe^{2+}$ substituting for other cations in the octahedral network, typically occurs and may impart a net negative charge on the clay structure. Naturally occurring elements within the gallery of the clay, such as water molecules or sodium or potassium cations, are attracted to the surface of the clay layers due to this net negative charge.

The composite of the present invention can be characterized as an intercalated nanocomposite, an exfoliated nancomposite, or combinations thereof. The term "intercalated nanocomposite", as used herein, describes a nanocomposite that consists of PNPs inserted at least partially in between clay layers. The term "exfoliated nanocomposite", as used herein, describes a nanocomposite wherein one or more PNPs and associated 0.5 to 40 nm thick CNPs forming a composite structure on the nanoscale are isolated or are dispersed in a matrix-aqueous, non-aqueous, or polymeric. Clays which have been modified according to the present invention, by the intercalation of PNPs between layers of clay particles, and around individual exfoliated clay nanoparticles exhibit an increase in the spacing distance between layers, as evidenced by x-ray diffraction measurements.

An exfoliated nanocomposite, when dispersed in a polymeric matrix is believed to maximize the polymer-clay interactions thereby making the entire surface of the clay layers available to the polymeric matrix. Without being bound to a particular theory this sructure may lead to the most dramatic changes in mechanical and physical properties of a polymer modified with the PNP-CNP composite. In contrast are compositions in which the clay acts as a conventional filler the clay is neither intercalated nor exfoliated. These compositions generally do not exhibit the improvement in mechanical and physical properties seen with intercalated or exfoliated nanocomposites. The PNPs of the present invention are selected to effectively provide intercalated nanocomposites, exfoliated nanocomposites and mixtures thereof. In certain embodiments of the present invention, some portion of the clay in the PNP-CNP nanocomposites may, however, exist as structures larger than exfoliated or intercalated composites.

The method of forming a composite composition of the present invention includes providing particular PNPs and admixing CNPs. The composite composition my be formed in an aqueous-based medium, in a solvent-based medium, or in a polymeric medium.

In one embodiment the composite composition is formed in an aqueous-based medium, for example, by providing PNPs in an aqueous-based medium and admixing a dispersion of a CNP precursor clay. Preferably, a PNP composition that is water-dispersible and sodium montmorillonite are used. More preferably, a PNP which contains amine-functional groups at low pH or an amphoteric PNP at any pH are used. Alternatively, the PNP may be formed from first, second, and, optionally, third monomers as disclosed herein in the presence of a dispersion of a CNP precursor clay in an aqueous-based medium, thereeby forming the PNP-CNP composite of this invention. Such composites in the form of a dispersion in an aqueous-based medium may then be blended with a polymer dispersion or isolated and blended with a polymer in solution or melt form.

In one embodiment the composite composition is formed in a solvent-based medium, for example, by providing PNPs in a solvent-based medium and admixing a dispersion of a CNP precursor clay. Preferably PNP compositions formed in the solvent-based medium and sodium montmorillonite are used. Alternatively the PNP may be formed from first, second, and, optionally, third monomers as disclosed herein in the presence of a dispersion of a CNP precursor clay in a solvent-based medium, thereby forming the PNP-CNP composite of this invention. Such composites in the form of a dispersion in a solvent-based medium may then be blended with a polymer dispersion or solution or, alternatively, be isolated and blended with a polymer in melt form.

In an another embodiment the composite composition is formed in a polymeric medium, for example, by providing PNPs and admixing a CNP precursor clay in a polymeric melt at a temperature above the glass transition temperature of the polymer such as, for example in an extruder. Preferably, isolated PNP compositions and montmorillonite are used in this case. Alternatively, the PNP may be formed from first, second, and, optionally, third monomers as disclosed herein in the presence of a dispersion of a CNP precursor clay in a polymeric medium, thereby forming the PNP-CNP composite of this invention in the polymeric medium.

The composite compositions of the present invention include PNPs and CNPs in a dry weight ratio of PNP/CNP of from 1/20 to 10/1, preferably of from 1/2 to 3/1.

In another aspect, the present invention is directed to a polymeric composition including a continuous polymeric phase and, therein, discontinuous inclusions of the PNP-CNP compositions described hereinabove and a method for forming the same by: (a) providing a polymeric material; and (b) admixing the composite composition of claim 1. By "admixing the composite composition" herein is meant either mixing the preformed composite composition with the polymeric material or forming the composite composition in the presence of the polymeric material, in any event with or without the presence of a fluidizing medium such as, for example, an organic solvent or water and with or without the application of dispersing or shearing forces to effect the distribution of the composite composition.

The polymeric phase includes, for example, acrylic polymers such as poly(methyl methacrylate), vinyl polymers such as poly(vinyl chloride), polyolefins such as polypropylene, poly(styrene), condensation polymers such as polyesters, polyamides, copolymers and alloys thereof, and the like. Such compositions typically include at least one PNP-CNP composite composition at a level of from 1% to 30%, preferably from 2% to 20%, and more preferably from 2% to 10%, by weight based on the weight of the overall composition. Without being bound by a particular theory it is believed that the PNP-CNP composites confer barrier properties and a level of reinforcement and toughness to the polymer matrix which is benefited not only by the nanoscale of both the PNP and the CNP of the composite but also by the selection of the composition of the PNP in order to insure compatibility of the composite and the polymer matrix.

The PNP-CNP compositions of the present invention have a wide variety of uses, including in coatings, adhesives, plastics, fiber and textile polymers, leather topcoats, and caulks and sealants. In coatings, they are particularly useful in flame retardant paints, for low volatile organic compound (low VOC) coatings and paints, and in elastomeric coatings, paints, and exterior insulation and finish systems (EIFS), where the dirt pickup resistance, toughness, and flame retardancy properties of the PNP-CNP compositions are especially useful. In adhesives, the PNP-CNP compositions are particularly useful in high shear adhesives, and packaging adhesives requiring enhanced vapor and liquid barrier properties. In the fiber and textile area, PNP-CNP compositions are useful in flame retardant fabric binders, and in binders that are resistant to dry cleaning fluids and to abrasion. The PNP-CNP compositions of the present invention are useful in topcoat formulations for leather, because of their durability and embossing release properties. In the area of caulks and sealants, the PNP-CNP compositions of the present invention are useful because of their good barrier and adhesion properties and their flexural properties, especially their ability to bridge cracks.

EXAMPLES

Example 1

Preparation of PNP-CNP Composite

A PNP dispersion of copolymerized methyl methacrylate (MMA)/dimethyl aminoethyl methacrylate (DMAEMA)/trimethylol propane triacrylate (TMPTA) in a ratio of 40/50/10 wt. % was prepared as follows: A 5 liter reactor was fitted with a thermocouple, a temperature controller, a purge gas inlet, a water-cooled reflux condenser with purge gas outlet, a stirrer, and a monomer feed line. To a separate vessel was charged 450 g of a mixture (A) containing 120 g isopropyl alcohol (IPA), 192 g MMA, 240 g DMAEMA, and 48 g TMPTA. To an additional vessel was charged an initiator mix (B) consisting of 19.2 g of a 75% solution of t-amyl peroxypivalate in mineral spirits (Triganox 125-$C_{75}$), and 18 g isopropyl alcohol. A charge of 2462 g IPA was added to the reactor. After sweeping the reactor with nitrogen for approximately 30 minutes, heat was applied to bring the reactor charge to 79° C. When the contents of the reactor reached 79° C., a dual feed of both the monomer mixture (A) and the initiator mix (B) to the reactor was begun. The two mixtures were fed uniformly using feed pumps over 120 minutes. At the end of the monomer and initiator feeds, the batch was held at 79° C. for 30 minutes before adding the three initiator chasers consisting of 9.6 g of a 75% solution of t-amyl peroxypivalate in mineral spirits (Triganox 125-$C_{75}$), and 24 g IPA sequentially. The batch was then held at the polymerization temperature of 79° C. for an additional 2.5 hours. Then a mixture of 40.5 g aqueous 37% solution of HCl and 261.4 g water was added. The neutralized PNP dispersion was transferred to a roto-evaporator and stripped at 35° C. under vacuum, adding water as necessary to maintain a flowable viscosity. After removing most of the solvent, the PNP dispersion was further diluted with water to 28.4 wt. % PNP in water. A transparent yellow dispersion of PNP in water, with 11.3% residual IPA, resulted. The product had a pH of 3.0 and viscosity of 60 centipoise. The PNP had a weight average diameter of 6.5 nm, measured by light scattering.

Four grams of sodium montmorillonite ("PGV clay"; Nanocor, Inc. Arlington Heights, Ill.) was dispersed into deionized water at 60° C. and stirred for 30 minutes. 300 cc of the PNP dispersion described above was added to the montmorillonite dispersion and the mixture stirred vigorously for 3 hours. The mixture was left to settle overnight at room temperature. The precipitated PNP/clay composite was filtered and washed with 1 l deionized water. The product was dried under vacuum at 60° C. for 24 hours and ground into a fine particle powder using ultra milling. Wide angle X-ray diffraction of this product was utilized to find a d-spacing of 3.325 nm.

Examples 2-8

Preparation of PNP-CNP Composites

According to the procedure of Example 1, the PNPs described in the table below were prepared (monomer levels are in weight %). These PNPs were admixed with sodium montmorillonite to produce a PNP/CNP composite. X-ray diffraction results are reported in the Table 2.1 below.

TABLE 2.1

PNP-CNP Composites

| Example | PNP Composition | d-spacing (nm) |
|---|---|---|
| 2 | 30 MMA/60 DMAEMA/10 TMPTA | 2.220 |
| 3 | 50 MMA/40 DMAEMA/10 TMPTA | 3.102 |
| 4 | 60 MMA/30 DMAEMA/10 TMPTA | 3.514 |
| 5 | 25 MMA/25 BA/40 DMAEMA/10 TMPTA | 3.432 |
| 6 | 50 BA/40 DMAEMA/10 TMPTA | 3.310 |
| 7 | 50 MMA/30 DMAEMA/10 HEMA/10 TMPTA | 3.417 |
| 8 | 50 MMA/20 DMAEMA/20 HEMA/10 TMPTA | 3.325 |
| 9 | 50 MMA/20 DMAEMA/20 HEMA/10 TMPTA | 2.72 |

BA = Butyl acrylate
HEMA = 2-Hydroxyethyl methacrylate
MMA = Methacrylic acid

Example 10

Preparation of a PNP-CNP Modified Coatings Polymer

The PNP-CNP composite of example 5 (including a PNP having the composition 25 MMA/25 BA/40 DMAEMA/10 TMPTA) is admixed with or, alternatively, present during the polymerization of an all-acrylic copolymer (Tg=50° C., Mw=70,000) dissolved in toluene (40 weight % solids). The PNP-CNP composite is present at a level of 10 weight % solids based on the solids of the acrylic copolymer. Films form these PNP-CNP composite-modified solvent borne acrylic coatings will be tougher (higher tensile strength and modulus without embrittlement) than the unmodified solvent borne acrylic coating.

What is claimed is:

1. A composite composition comprising
   (a) polymeric nanoparticles ("PNPs") comprising, as copolymerized units, from 1% to 50%, by weight, based on the weight of said nanoparticles, of at least one multiethylenically unsaturated first monomer; from 2% to 75%, by weight based on the weight of said nanoparticles, of at least one ethylenically unsaturated second monomer, said second monomer bearing at least one group selected from the group consisting of hydroxy; silyl; polyalkylene oxide; quaternary ammonium; quaternary phosphonium; amines, amine N-oxides, carboxylic acids, sulfur acids, phosphorous acids, and salts thereof; and from 0% to 97%, by weight based on the weight of said nanoparticles, of at least one monoethylenically unsaturated third monomer, said nanoparticles having a mean diameter from 1 nanometer to 50 nanometers; and
   (b) clay nanoparticles ("CNPs").

2. The composition of claim 1 wherein the dry weight ratio of PNP/CNP is from 1/20 to 10/1.

3. A method of forming a composite composition comprising:
   (a) providing polymeric nanoparticles comprising, as copolymerized units, from 1% to 50%, by weight, based on the weight of said nanoparticles, of at least one multiethylenically unsaturated first monomer; from 2% to 75%, by weight based on the weight of said nanoparticles, of at least one ethylenically unsaturated second monomer, said second monomer bearing at least one group selected from the group consisting of hydroxy; silyl; polyalkylene oxide; quaternary ammonium; quaternary phosphonium; amines, amine N-oxides, carboxylic acids, sulfur acids, phosphorous acids, and salts thereof: and from 0% to 97%, by weight based on the weight of said nanoparticles, of at least one monoethylenically unsaturated third monomer, said nanoparticles having a mean diameter from 1 nanometer to 50 nanometers; and
   (b) admixing clay nanoparticles.

4. The method of claim 3 wherein the dry weight ratio of PNP/CNP is from 1/20 to 10/1.

5. A modified composition comprising a continuous polymeric phase, said phase comprising therein the composite composition of claim 1.

6. The modified composition of claim 5 wherein said composite composition is from 1 to 30% of said modified composition, by weight, based on the weight of said modified composition.

7. A method of forming the modified composition of claim 5 comprising:
   (a) providing a polymeric material; and
   (b) admixing the said composite composition.

8. The method of claim 7 wherein said composite composition is from 1 to 30% of said modified composition, by weight, based on the weight of said modified composition.

* * * * *